(12) United States Patent
Sambi et al.

(10) Patent No.: US 11,897,792 B2
(45) Date of Patent: *Feb. 13, 2024

(54) SYSTEMS FOR WATER BLENDING CONTROL

(71) Applicant: Pentair Filtration Solutions, LLC, Hanover Park, IL (US)

(72) Inventors: Manasa Sambi, Hanover Park, IL (US); Blake Brewer, Hanover Park, IL (US)

(73) Assignee: PENTAIR FILTRATION SOLUTIONS, LLC, Hanover Park, IL (US)

(*) Notice: Subject to any disclaimer, the term of this patent is extended or adjusted under 35 U.S.C. 154(b) by 53 days.

This patent is subject to a terminal disclaimer.

(21) Appl. No.: 17/653,081

(22) Filed: Mar. 1, 2022

(65) Prior Publication Data
US 2022/0177332 A1    Jun. 9, 2022

Related U.S. Application Data

(63) Continuation of application No. 16/279,717, filed on Feb. 19, 2019, now Pat. No. 11,261,106.
(Continued)

(51) Int. Cl.
*C02F 1/44* (2023.01)
*C02F 1/00* (2023.01)
(Continued)

(52) U.S. Cl.
CPC .............. *C02F 1/441* (2013.01); *B01D 61/12* (2013.01); *C02F 1/008* (2013.01); *B01D 61/025* (2013.01);
(Continued)

(58) Field of Classification Search
None
See application file for complete search history.

(56) References Cited

U.S. PATENT DOCUMENTS 3,493,496 A    2/1970   Bray et al.
3,505,216 A    4/1970   Kryzer
(Continued)

FOREIGN PATENT DOCUMENTS

EP    1457460 A2    9/2004
EP    2205343 A2    7/2010
(Continued)

OTHER PUBLICATIONS

Specification of U.S. Appl. No. 62/595,754, filed Dec. 7, 2017 (Year: 2017).*

(Continued)

*Primary Examiner* — Chester T Barry
(74) *Attorney, Agent, or Firm* — Husch Blackwell LLP

(57) ABSTRACT

A reverse osmosis water system including a housing, a reverse osmosis cartridge, an unfiltered waterline, and a blend waterline. The housing includes an inlet and an outlet. A medial waterline transports pretreated water to the reverse osmosis cartridge. An unfiltered waterline includes a flow restrictor. A blend waterline transports a blended water mixture to the outlet. The blended waterline receives filtered water at a first flowrate from the medial waterline and unfiltered water at a second flowrate downstream of the flow restrictor. The flow restrictor provides the second flowrate at a substantially equal rate to the first flowrate.

20 Claims, 9 Drawing Sheets

Related U.S. Application Data

(60) Provisional application No. 62/632,161, filed on Feb. 19, 2018.

(51) Int. Cl.
    *B01D 61/12* (2006.01)
    *B01D 61/02* (2006.01)
    *B01D 61/08* (2006.01)
    *B01D 61/04* (2006.01)

(52) U.S. Cl.
    CPC .............. *B01D 61/04* (2013.01); *B01D 61/08* (2013.01); *B01D 2311/04* (2013.01); *B01D 2311/08* (2013.01); *B01D 2311/25* (2013.01); *B01D 2313/18* (2013.01); *B01D 2319/025* (2013.01); *B01D 2319/06* (2013.01); *C02F 2201/005* (2013.01); *C02F 2201/006* (2013.01); *C02F 2209/03* (2013.01); *C02F 2209/10* (2013.01); *C02F 2209/40* (2013.01); *C02F 2301/043* (2013.01)

(56) References Cited

U.S. PATENT DOCUMENTS

| | | | |
|---|---|---|---|
| 3,616,921 | A | 11/1971 | Bray |
| 4,629,568 | A | 12/1986 | Ellis, III |
| 4,784,771 | A | 11/1988 | Wathen et al. |
| 5,006,234 | A | 4/1991 | Menon et al. |
| 5,160,608 | A | 11/1992 | Norton |
| 6,797,173 | B1 | 9/2004 | Oklejas, Jr. |
| 7,303,666 | B1 | 12/2007 | Mitsis |
| 7,407,585 | B2 | 8/2008 | Gaignet |
| 7,686,950 | B2 | 3/2010 | Gaignet |
| 7,938,956 | B2 | 5/2011 | Gaignet |
| 8,083,936 | B1 | 12/2011 | Walker |
| 8,784,662 | B2 | 7/2014 | Becker et al. |
| 9,375,683 | B2 | 6/2016 | Becker et al. |
| 9,795,922 | B2 | 10/2017 | Jons |
| 9,796,608 | B2 | 10/2017 | Servida |
| 11,261,106 | B2* | 3/2022 | Sambi .................... C02F 1/008 |
| 2003/0127381 | A1 | 7/2003 | Gsell |
| 2003/0141250 | A1 | 7/2003 | Kihara et al. |
| 2009/0134080 | A1 | 5/2009 | Fabig |
| 2011/0315632 | A1 | 12/2011 | Freije, III et al. |
| 2012/0205307 | A1 | 8/2012 | Boudinar |
| 2013/0126430 | A1 | 5/2013 | Kneley et al. |
| 2015/0344340 | A1 | 12/2015 | Levy et al. |
| 2016/0130155 | A1 | 5/2016 | Isogami et al. |
| 2017/0129795 | A1* | 5/2017 | Singh .................. B01D 61/025 |
| 2017/0152154 | A1 | 6/2017 | Saveliev et al. |
| 2017/0239620 | A1 | 8/2017 | Warsinger et al. |
| 2019/0177185 | A1* | 6/2019 | Oklejas, Jr. ............ B01D 63/12 |

FOREIGN PATENT DOCUMENTS

| | | |
|---|---|---|
| EP | 2493818 A1 | 9/2012 |
| EP | 1948344 B1 | 1/2013 |
| EP | 2641652 A3 | 9/2013 |
| WO | 2007045015 | 4/2007 |
| WO | 2009035700 A3 | 3/2009 |
| WO | 2011051666 A1 | 5/2011 |
| WO | 2011130341 A1 | 10/2011 |
| WO | 2011149988 A1 | 12/2011 |
| WO | 2013040420 A2 | 3/2013 |
| WO | 2016074763 A1 | 5/2016 |

OTHER PUBLICATIONS

Seyed Kamaleddin Mousavi Mashhad et al: "Design and manufacture of TDS measurement and control system for water purification in reverse osmosis by PIO fuzzy logic controller with the ability to compensate effects of temperature on measurement", ELEKTRI K, vol. 24, Jan. 1, 2016 (Jan. 1, 2016), pp. 2589-2608.

Extended European Search Report; European Application No. 19158160.2, dated Jul. 24, 2019, 10 pages.

\* cited by examiner

SYSTEMS FOR WATER BLENDING CONTROL

RELATED APPLICATIONS

This application is a continuation of U.S. application Ser. No. 16/279,717, filed Feb. 19, 2019, now U.S. Pat. No. 11,261,106, which claims the benefit of, and priority to, U.S. Provisional Application Ser. No. 62/632,161, filed Feb. 19, 2018, the entire contents of which are incorporated herein by reference.

BACKGROUND

Water filtration systems are frequently used in a variety of settings, including residential and commercial applications, in which the systems are designed to remove contaminants and other impurities from the water supply to provide filtered water to equipment and/or an end user. To that end, source water quality and pressure can vary in different locations, which requires unique filtration parameters tailored to the specific properties of the water being filtered and the level and quality of filtration desired by the end user.

Commercial water filtration systems typically include a filter cartridge coupled to a manifold or housing, and can be installed at any number of locations along the water supply line. In many commercial applications, the same quality of water is desired at the end use, regardless of the feed water received into the system. Thus, it is desirable for the water that is drawn into a filtering system to be filtered to achieve a consistent water quality. Attaining a water quality having a desired consistency from location to location has historically required the use of complicated and expensive systems employing a number of filtering components. As a result, current systems can be cost prohibitive.

SUMMARY

Accordingly, there is a need to provide a system that addresses one or more of the above noted problems that may be associated with current water filtration systems.

Some embodiments of the invention provide a reverse osmosis water system for use with a water source, the system including a housing, a reverse osmosis cartridge, an unfiltered waterline, and a blend waterline. The housing includes an inlet and an outlet. The inlet receives untreated water from the water source. The reverse osmosis cartridge is fluidly coupled to a medial waterline. The medial waterline transports a first portion of pretreated water to the reverse osmosis cartridge. The unfiltered waterline includes a flow restrictor and is fluidly coupled to the medial waterline. The unfiltered waterline receives a second portion of pretreated water. The blend waterline is fluidly coupled to the medial waterline and the unfiltered waterline. The blend waterline transports a blended water mixture to the outlet. The blended waterline receives filtered water delivered at a first flowrate from the medial waterline downstream of the reverse osmosis cartridge. The blend waterline receives unfiltered water delivered at a second flowrate from the unfiltered waterline downstream of the flow restrictor. The flow restrictor provides the second flowrate at a substantially equal rate to the first flowrate.

Some embodiments of the invention provide a reverse osmosis water system for use with a water source including an inlet and an outlet, a reverse osmosis cartridge, an unfiltered waterline and a blend waterline. The inlet receives untreated water from the water source. The reverse osmosis cartridge is fluidly coupled to a medial waterline, which provides a first portion of pretreated water to the reverse osmosis cartridge. The unfiltered waterline is fluidly coupled to the medial waterline and receives a second portion of pretreated water at the first flowrate. The unfiltered waterline has a flow restrictor and a blend valve. The flow restrictor reduces the first flowrate to the second flowrate. The blend waterline is fluidly coupled to the medial waterline downstream of the reverse osmosis cartridge and is fluidly coupled to the unfiltered waterline downstream of the flow restrictor and the blend valve. The unfiltered waterline provides unfiltered water to the blend waterline at the second flowrate. The reverse osmosis cartridge provides filtered water to the blend waterline at the third flowrate. The flow restrictor and the blend valve control the second flowrate to be substantially equal to the third flowrate.

Some embodiments of the invention provide a reverse osmosis water system for use with a water source, the system including an inlet and an outlet, a pre-filter cartridge, a reverse osmosis cartridge, an unfiltered waterline in parallel to the reverse osmosis cartridge, and a blend waterline. The inlet receives untreated water. The pre-filter cartridge is fluidly coupled to the inlet via an inlet waterline. The reverse osmosis cartridge is fluidly coupled to the pre-filter cartridge. The reverse osmosis cartridge receives a first portion of pretreated water from the pre-filter cartridge. The unfiltered waterline receives a second portion of pretreated water from the pre-filter cartridge. The unfiltered waterline has a flow restrictor. The blend waterline receives unfiltered water from the flow restrictor and filtered water from the reverse osmosis cartridge. The reverse osmosis cartridge provides the filtered water to a first flowrate. The flow restrictor provides the unfiltered water at a second flowrate. The first flowrate and the second flowrate are substantially equal.

DETAILED DESCRIPTION

Figure 1:
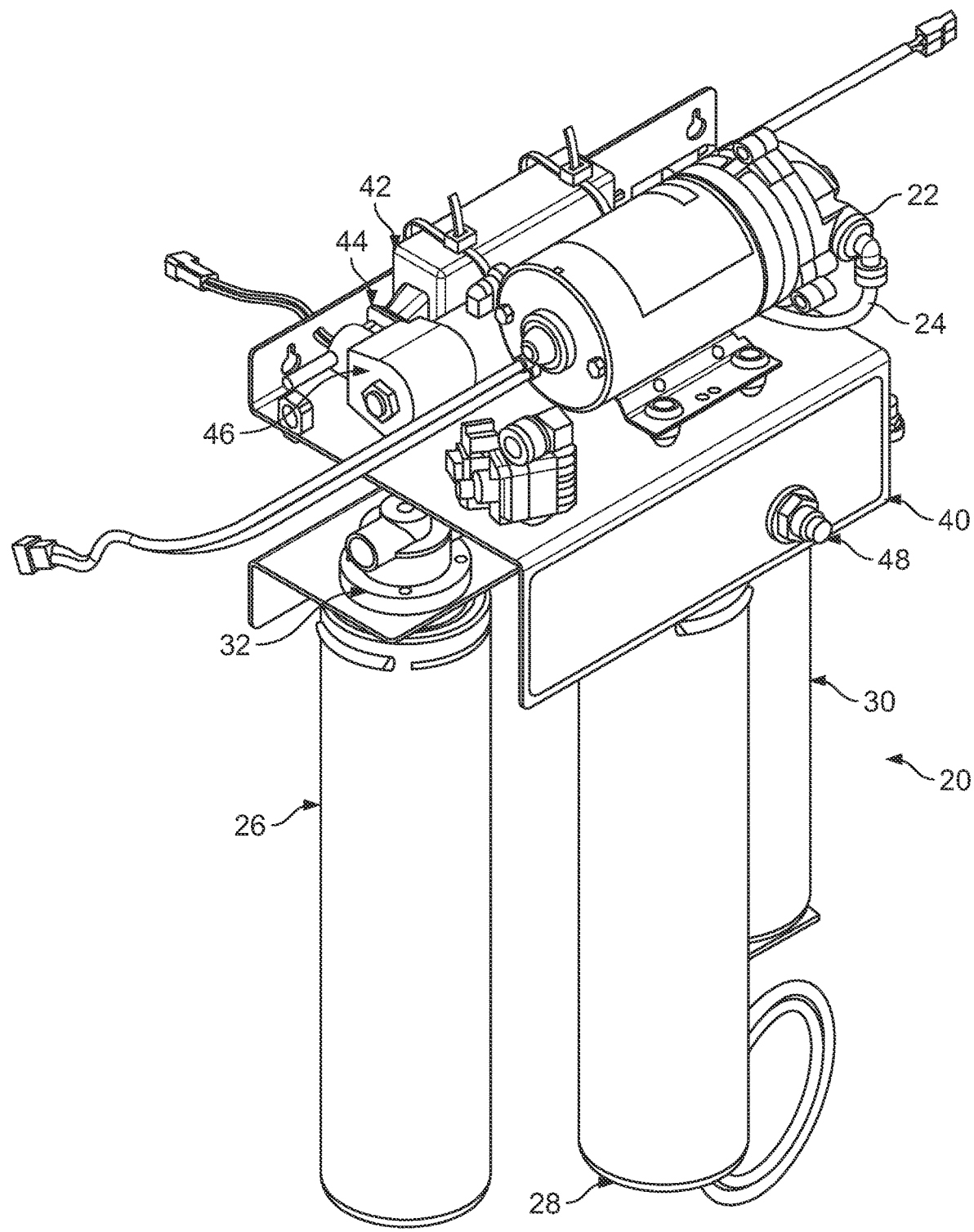
FIG. 1 is a perspective view of a filtration system according to one embodiment of the invention.

Before any embodiments are explained in detail, it is to be understood that the embodiments disclosed herein are not limited in application to the details of construction and the arrangement of components set forth in the following description or illustrated in the following drawings. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term "upstream" refers to a location closer to the inlet of the water, while the term "downstream" refers to a location closer to the outlet of the water.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize that the examples provided herein have many useful alternatives and fall within the scope of embodiments of the invention.

Figure 4:
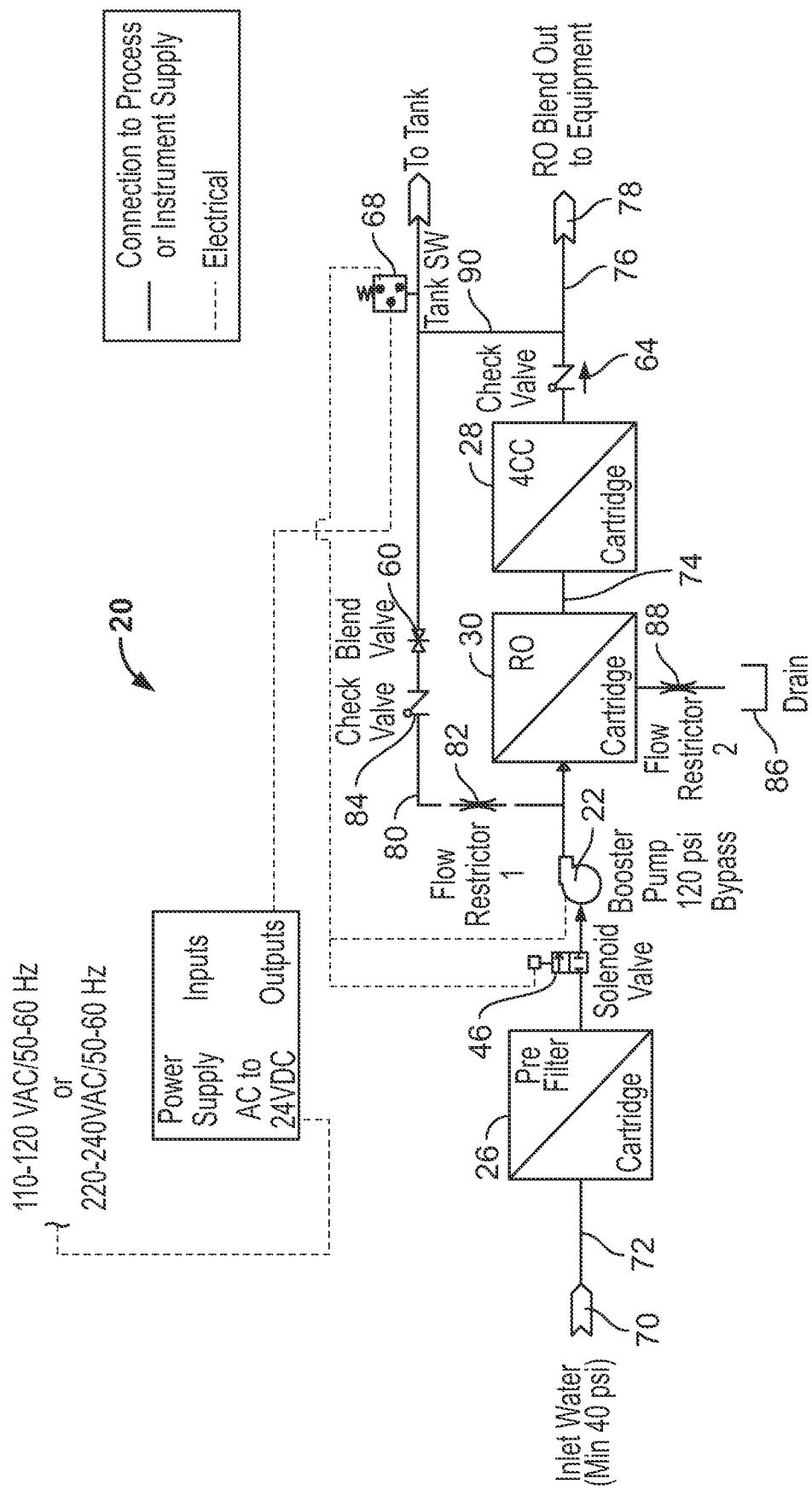
FIG. 4 is a schematic illustration of the water filtration system of FIG. 1.
Figure 5:
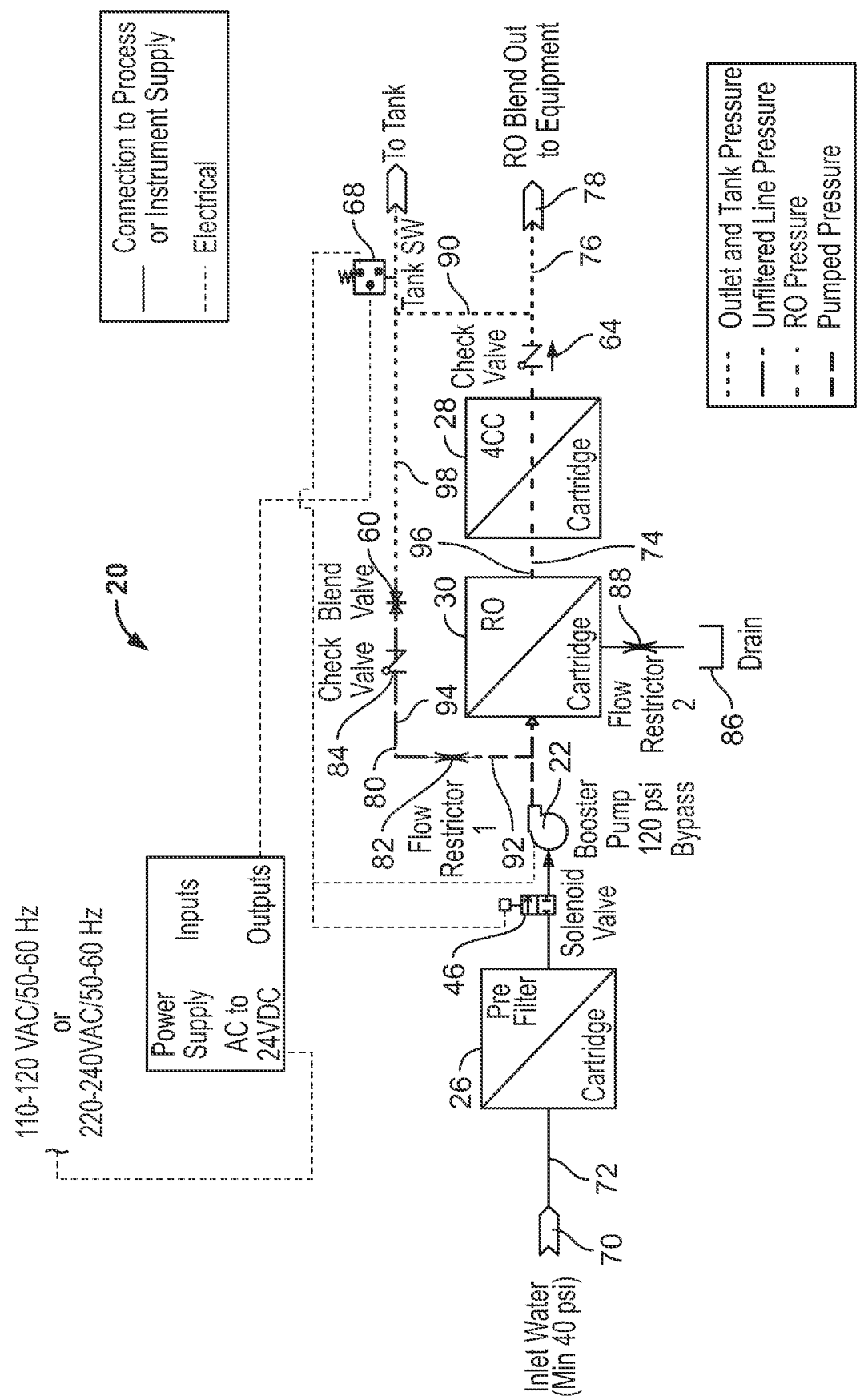
FIG. 5 is another schematic illustration of the water filtration system of FIG. 1 illustrating pressure differentials across the system.

FIG. 1 illustrates a reverse osmosis (RO) water filtration system 20 according to some embodiments of the invention. The water filtration system 20 may include features that make the system unique to the commercial market (e.g., designed to be used by commercial entities). For example, the water filtration system 20 is designed to be coupled with a storage tank (not shown), and includes a pump 22, and various flow conduits 24 that fluidly couple the pump 22 with the tank that stores end-use water that is blended to a desired degree. In some embodiments, a blended water mixture may be stored in the tank and/or provided to an outlet 78, as shown in FIGS. 4 and 5. The filtration system can include a housing (as shown and described with respect to FIGS. 8-10) to protect the components and fluid connections.

In some embodiments, the water filtration system 20 can offer a compact, efficient system that can be installed by a single person. The installation time for the water filtration system 20 may be reduced by minimal on-site assembly requirements. The water filtration system 20 may include disposable and recyclable filter cartridges 26, 28 and 30. In some embodiments, the cartridges may be changed periodically, for example, every 12 months. In other embodiments, the time the cartridges may be changed may be based on use. The reverse osmosis system 10 may include an integrated display and cover. The cover can include a shroud that is hinged on one side and pivots to expose the serviceable components. The water filtration system 20 can offer increased sustainability through low-water waste, low-energy use, recyclable filter cartridges, and modular/re-buildable components.

As shown in FIG. 1, the water filtration system 20 includes the pump 22, a pre-filter cartridge 26, a post-treatment cartridge 28, a reverse osmosis (RO) cartridge 30, and one or more head caps 32 that may be coupled with one or more of the pre-filter cartridge 26, the post-treatment cartridge 28, and/or the RO cartridge 30. The post-treatment cartridge 28 may be a mineral adding cartridge rather than a filtration cartridge. In some embodiments, the post-treatment cartridge 28 is a 4CC post-filter that is capable of adding calcium or another mineral to the water as it passes through the post-treatment cartridge 28.

The water filtration system 20 further includes a housing 40 to which the cartridges 26, 28, 30 are coupled. In some embodiments, the cartridges 26, 28 and 30 are connected in series through the housing 40. The pump 22 is also mechanically coupled within the housing 40. The pump 22 may be a booster pump. Also shown in FIG. 1 is a power source 42 having a cord 44 and a solenoid valve 46. The power source 42 and the solenoid valve 46 are also coupled to the housing 40. A blend valve knob 48 is shown extending from the housing 40. The blend valve knob 48 is operable to manipulate one or more settings of a blend valve 60, as shown in FIG. 2.

Figure 2:
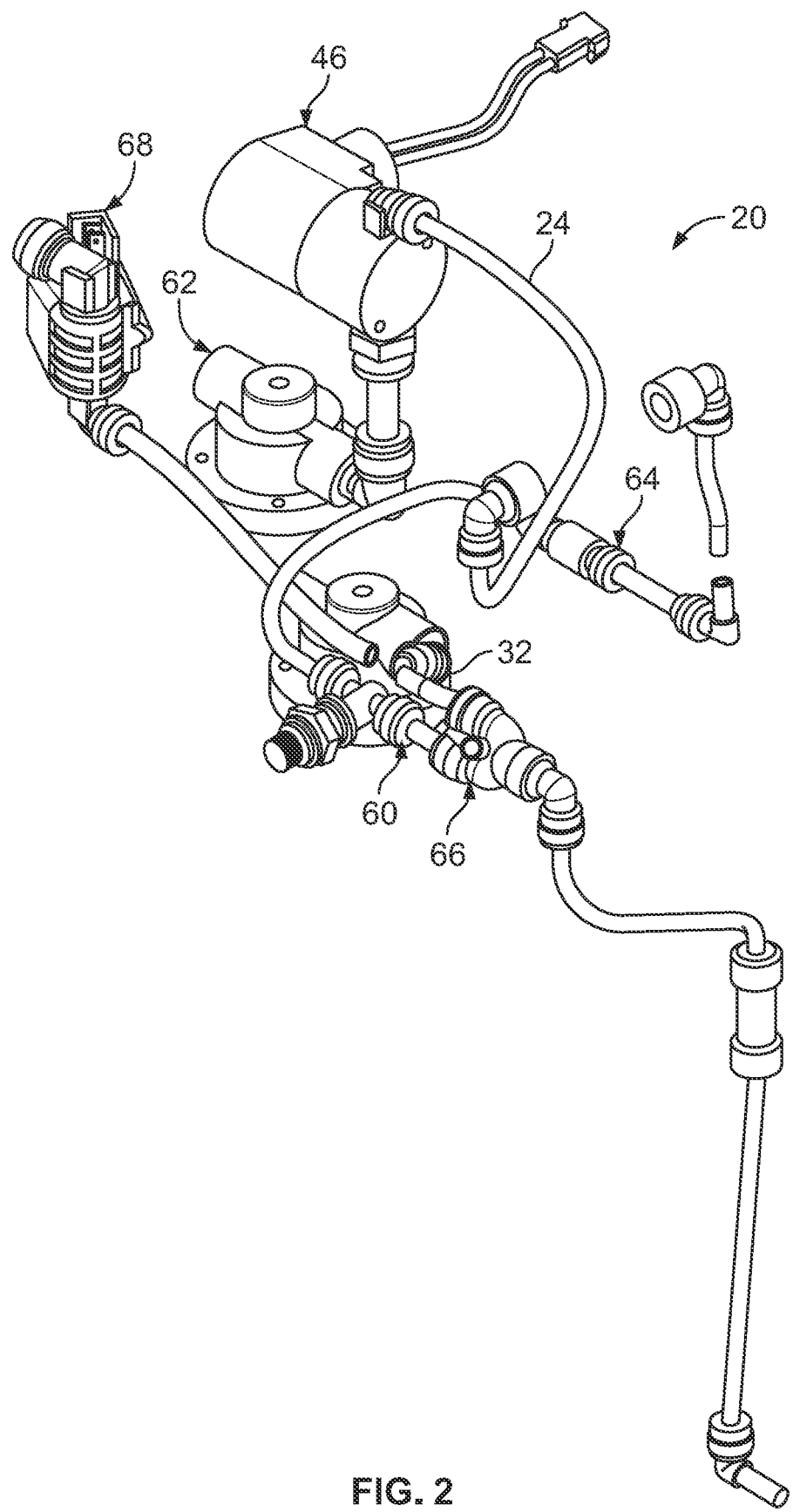
FIG. 2 is a perspective view of some of the components of the filtration system of FIG. 1.
Figure 3:
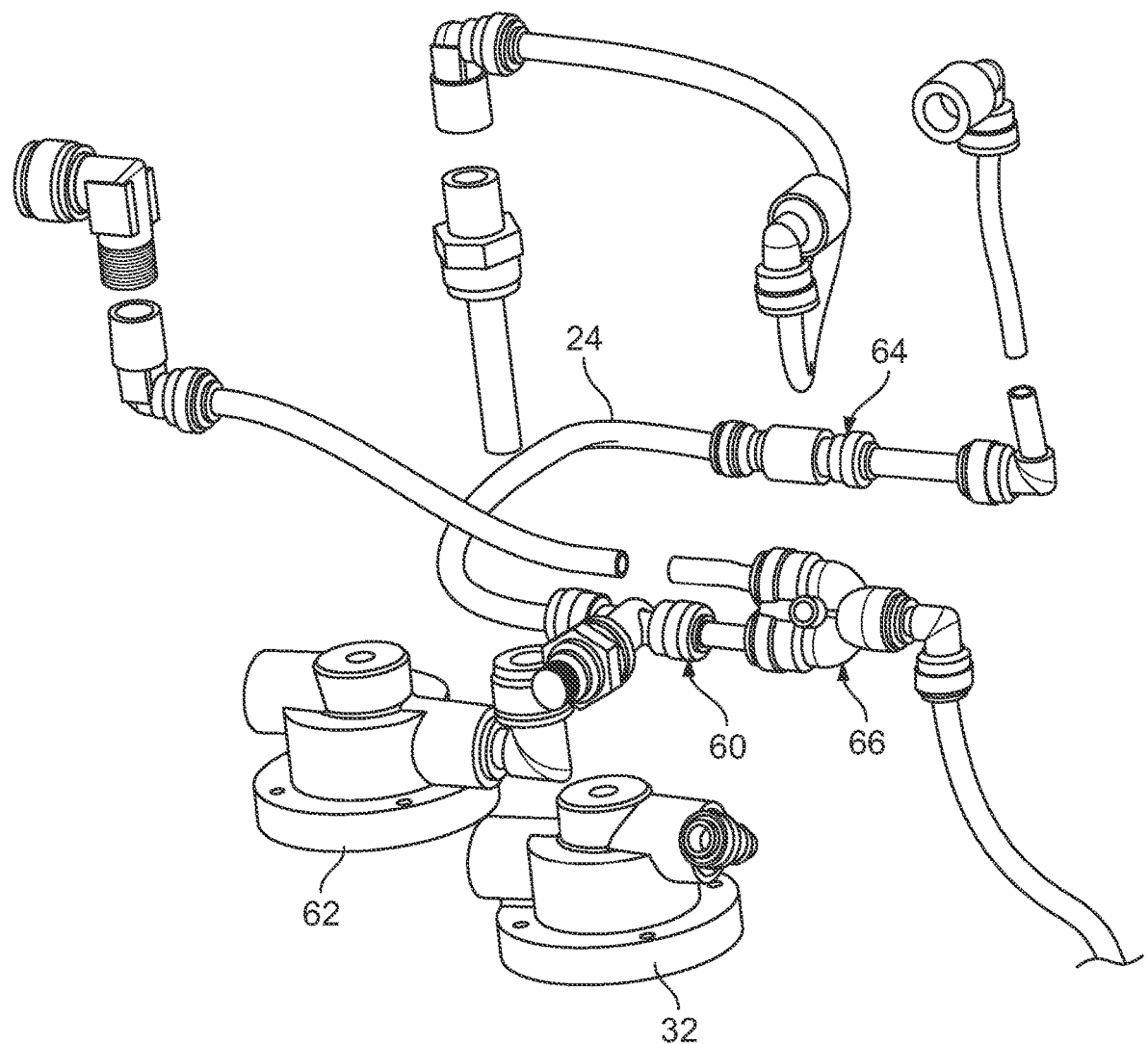
FIG. 3 is another perspective view of some of the components of the filtration system of FIG. 1.

FIG. 2 illustrates a pre-filter head cap 62 (which is one of the head caps 32) that is fluidly coupled to the solenoid valve 46. FIG. 2 also illustrates a first check valve 64 and a divider 66. The divider 66 combines water from two streams into a single stream. FIG. 2 also illustrates a pressure switch 68 connected to a controller (not shown).

FIGS. 4 and 5 schematically illustrate the flow paths of the water filtration system 20, with FIG. 5 showing pressure measurements within the various flow paths. FIG. 4 illustrates a water inlet 70, the pre-filter cartridge 26, the solenoid valve 46, the pump 22, the RO cartridge 30, the post-treatment cartridge 28, and the first check valve 64. These components of the water filtration system 20 may be provided in the order listed and as shown in FIG. 4, i.e., each component may be located upstream of the component it precedes as listed. In such an arrangement, the pre-filter cartridge 26, the solenoid valve 46, the pump 22, the RO cartridge 30, the post-treatment cartridge 28, and the first check valve 64 may be in series with respect to one another.

In some embodiments, the components of the water filtration system 20 shown in FIG. 4 are located within the housing 40. In other embodiments, some of the components may be located outside of the housing 40. Having the filtration and blending process occur within the housing has several advantages. First, the process results in a higher accuracy of the blend water mixture. Second, the water filtration system 20 maintains an internal pressure balance that also contributes to a blend product with a specific total dissolved solids (TDS) value.

In the water filtration system 20 shown in FIG. 4, the pre-treatment filter cartridge 26, the solenoid valve 46, and the booster pump 22 may be provided along an inlet water line 72. Untreated water is transported to the pre-treatment filter cartridge 26 via the inlet water line 72. The untreated water passes through the pre-treatment filter cartridge 26 resulting in pretreated water. The pretreated water passes through the solenoid valve 46 to the booster pump 22 where the pressure of the pretreated water may be increased. In some embodiments, the pressure of the pretreated water may be 120 pounds per square inch (psi). The RO cartridge 30, the post-treatment cartridge 28, and the first check valve 64 may be provided along a medial water line 74. A first portion of the pretreated water may be sent to the RO cartridge 30 via the medial water line 74. Filtered water exits the RO cartridge 30 on the permeate side and is sent to the post-treatment cartridge 28. A retentate stream exits the RO cartridge 30 via a drain water line, passes through a second flow restrictor 88, and out of the system through a drain 86.

FIG. 4 illustrates an unfiltered water line 80 intersecting the medial water line 74 between the pump 22 and the RO cartridge 30. The unfiltered water line 80 includes a first flow restrictor 82, a second check valve 84, and the blend valve 60. The first flow restrictor 82, the second check valve 84, and the blend valve 60 are provided in series with respect to one another, and the blend valve 60 is provided downstream of the second check valve 84. The first flow restrictor 82, the second check valve 84, and the blend valve 60 are also provided in parallel with respect to the RO cartridge 30 and the post-treatment cartridge 28. A second portion of the pretreated water from the pre-treatment cartridge 26 is sent to the first flow restrictor 82 via the unfiltered water line 80. The first flow restrictor 82 is configured to control the flowrate of unfiltered water in the unfiltered water line 80. The unfiltered water leaves the first flow restrictor 82 and passes through the second check valve 84 and the blend valve 60. In some embodiments, the flowrate of the unfiltered water leaving the blend valve 60 may be different than the flowrate of the filtered water leaving the first check valve 64. In one embodiment, the flowrate of the unfiltered water flowing through the blend valve 60 is the same or substantially equal to the flowrate of the filtered water flowing through the first check valve 64. The flowrates being the same or substantially equal has the advantage of improving the consistency of the total dissolved solids value of the blended water.

A blend water line 90 is provided between the unfiltered water line 80 and the outlet water line 76. The blend water line 90 is provided downstream of the blend valve 60 and the first check valve 64 along the unfiltered water line 80 and the outlet water line 76, respectively. The blend water line 90 may be provided along a different portion of one or both of the unfiltered water line 80 and the outlet water line 76. In some embodiments, the blended water line 90 may be provided before the filtered water passing through the post-treatment cartridge 28. In other embodiments, the blend water line 90 may be provided after the filtered water passes through the post treatment cartridge 28. The pressure switch 68 is provided along the unfiltered water line 80. A tank (not shown) may be fluidly coupled with the unfiltered water line 80. The outlet water line 76 may be connected in series with the medial water line 74 and is coupled to the outlet 78 of the water filtration system 20.

The filtered water from the RO cartridge 30 or the post-treatment cartridge 28 may be transported to the blend water line 90 to mix with the unfiltered water from the blend valve 60. The result is a blend water mixture having a particular TDS level. In some embodiments, the TDS level may be predetermined by a user. The TDS level of the blend water mixture may be monitored before or after leaving the housing 40. In some embodiments, a sensor (not shown) may detect the TDS level in the blended water mixture before or after leaving the housing 40. The TDS can be measured in milligram per liter (mg/L) and in parts per million (ppm). A user or technician can adjust the TDS of the water being dispensed to a value commonly used for certain types of beverages, such as coffee, tea, or beverage fountain drinks.

As shown in FIG. 5, during operation of the water filtration system 20, there is a first or pumped pressure 92 along a portion of the medial water line 74 and a portion of the unfiltered water line 80. There is a second or blend line pressure 94 along a portion of the unfiltered water line 80 between the flow restrictor and the blend valve. There is a third or RO pressure 96 along a portion of the medial water line 74 between the outlet of the RO cartridge 30 and the second check valve 84. Finally, there is a fourth or outlet and tank pressure 98 along a portion of the unfiltered water line 80, the blend water line 90, and the outlet water line 76. The pressures along varying portions of the system may be similar or different, depending on whether the tank is being filled or emptied. The pressures are different due to the configuration of the pump 22, the blend valve 60, the RO cartridge 30, and the first check valve 64.

Figure 6:
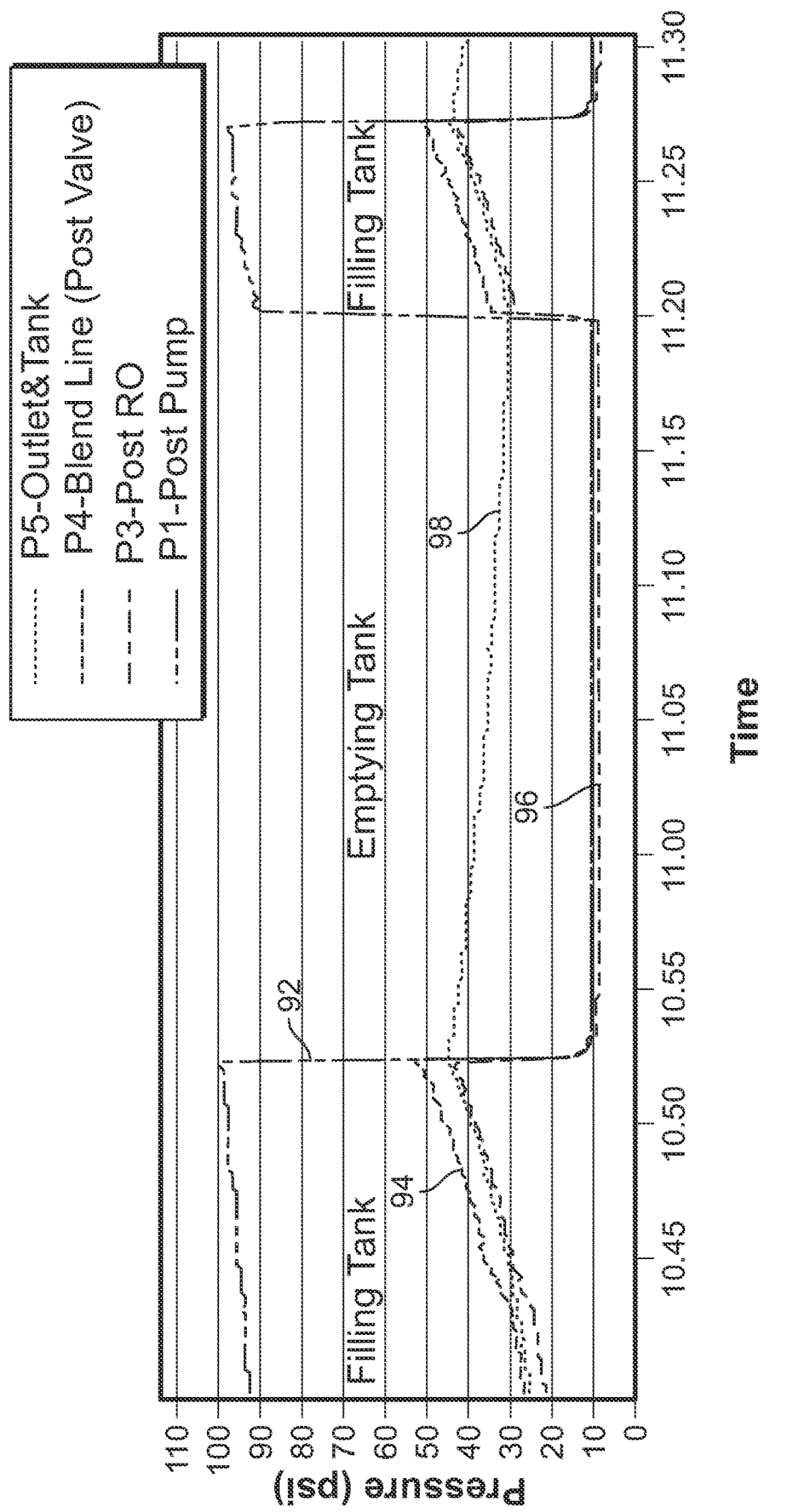
FIG. 6 is a pressure chart illustrating varying pressures within the filtration system of FIG. 1 over a period of time.

Referring to FIGS. 5 and 6, one or more of the pumped pressure 92, the blend line pressure 94, the RO pressure 96, and the outlet and tank pressure 98 may be the same or different, or may increase or decrease at the same rate or different rates during different time periods, such as when the tank is being filled, or when the tank is being emptied. For example, as shown in FIG. 6, when the tank is being filled, the pumped pressure 92 may steadily increase over time or may be generally constant, and may be between about 50 psi and about 110 psi, or between about 60 psi and about 100 psi, or about 90 psi. Further, when the tank is being filled, the blend line pressure 94, the RO pressure 96, and the pumped pressure 92 may also be steadily increasing, and may be between about 10 psi and about 70 psi, or between about 20 psi and about 60 psi, or about 25 psi. When the tank is being filled, the pumped pressure 92, the blend line pressure 94, the RO pressure 96, and the outlet and tank pressure 98 may be increasing at the same rate, or may be increasing at different rates.

As shown in FIG. 6, once the water filtration system 20 changes operation from filling the tank to emptying the tank, the pumped pressure 92 may drop significantly from the aforementioned tank filling range to between about 5 psi and about 30 psi, or between about 10 psi and about 20 psi, or about 12 psi. Further, when the system 20 switches operation to begin emptying the tank, one or both of the blend line pressure 94 and the RO pressure 96 may drop from the aforementioned tank filling pressure ranges to between about 5 psi and about 30 psi, or between about 10 psi and about 20 psi, or about 12 psi when the tank is being emptied. Once the water filtration system 20 enters and stays in the emptying tank process, the pumped pressure 92, the RO pressure 96, and/or the blend line pressure 94 may remain substantially constant, may slightly increase, or may slightly decrease until the water filtration system 20 enters into a different process, such as another filling tank process.

As also shown in FIG. 6, when the system 20 changes from the tank filling process to the tank emptying process, the outlet and tank pressure 98 may slightly begin to decrease from between about 20 psi and about 60 psi or between about 30 psi and about 50 psi to between about 10 psi and about 50 psi or between about 20 psi and about 40 psi. As a result, during the emptying tank process, the pumped pressure 92, the RO pressure 96, and the blend line pressure 94 may be approximately the same and may be generally constant, while during the same process, the outlet and tank pressure 98 may steadily decrease.

When the water filtration system 20 changes from the emptying tank process to another filling tank process, the pumped pressure 92 may substantially increase from the aforementioned emptying tank pressure ranges to between about 50 psi and about 110 psi, or between about 60 psi and about 100 psi, or about 90 psi. Still further, when the system 20 changes from the emptying tank process to the filling tank process, the RO pressure 96 and the blend line pressure 94 may increase from the aforementioned emptying tank pressure ranges to between about 10 psi and about 70 psi, or between about 20 psi and about 60 psi, or about 25 psi. Further, when the system 20 changes from the emptying tank process to the filling tank process, the outlet and tank pressure 98 may transition from decreasing to increasing. As mentioned previously with respect to the first filling tank process, all of the varying pressures may increase over the duration of the filling tank process.

Figure 7:
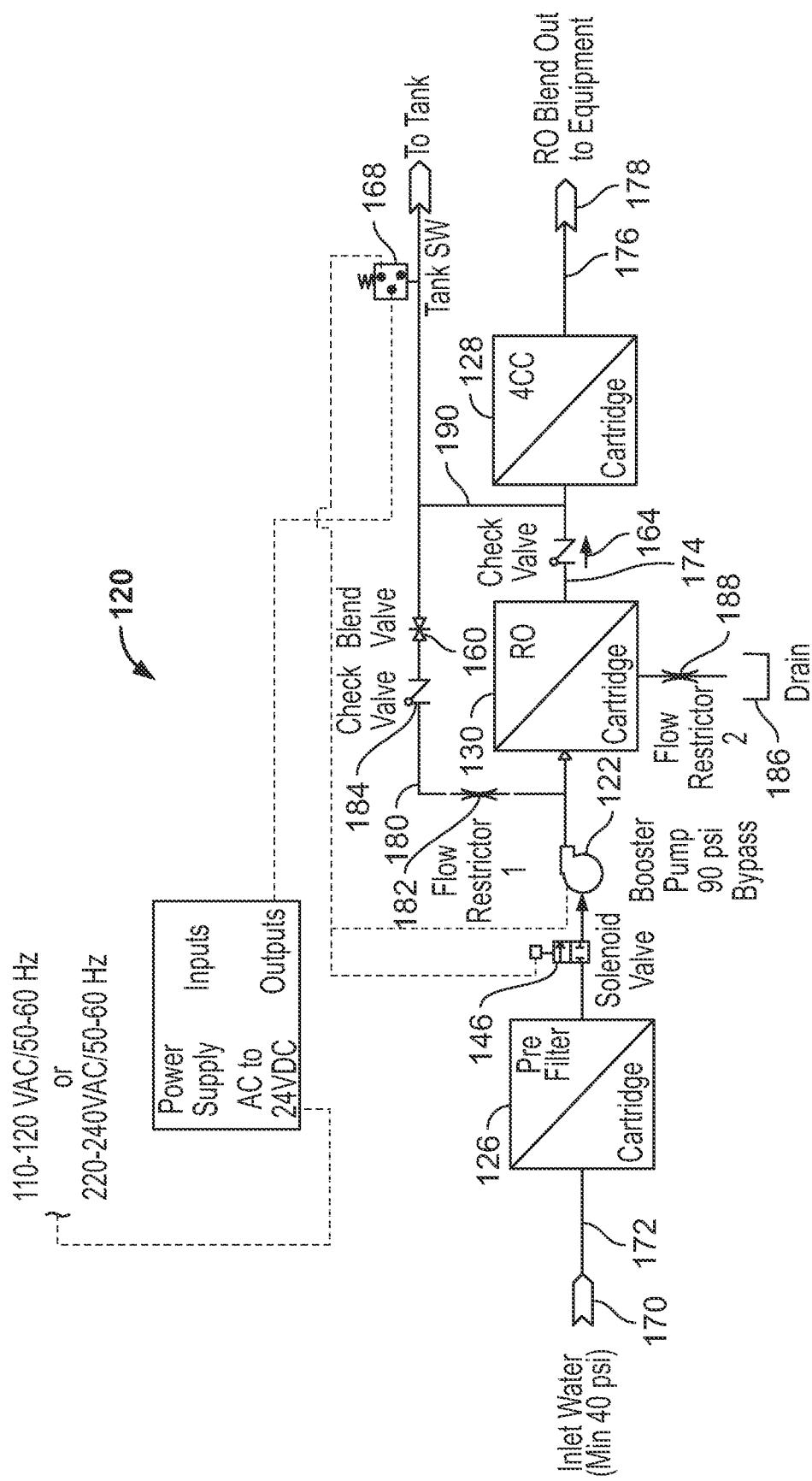
FIG. 7 is a schematic illustration of a water filtration system according to another embodiment of the invention.

FIG. 7 illustrates an alternative embodiment of a water filtration system 120. The differences between the water filtration system 120 of FIG. 7 and the water filtration system 20 of FIG. 4 are that a first check valve 164 is provided between an RO cartridge 130 and a post-treatment cartridge 128 and a blend water line 190 is provided between the first check valve 164 and the post-treatment cartridge 128. As a result, a loop is formed by (1) a portion of a unfiltered water line 180 including a first flow restrictor 182, a second check valve 184, and a blend valve 160; (2) the blend water line 190; and (3) a portion of a medial water line 174 including the RO cartridge 130 and the first check valve 164.

In operation, water flows into the water inlet 70/170, along the inlet water line 72/172, and into the pre-filter cartridge 26/126. The water then flows through the solenoid valve 46/146 when the solenoid valve is in an "open" configuration. Water then flows into the booster pump 22/122, and a portion may be directed toward the medial water line 74/174, and/or the unfiltered water line 80/180. Water that is directed to the unfiltered water line 80/180 passes through the first flow restrictor 82/182, the second check valve 84/184, and the blend valve 60/160. Water in the unfiltered water line 80/180 is then either directed to the tank past the pressure switch 68/168, or is directed to the blend water line 90/190.

In the water filtration system 20 of FIG. 4, water that is directed to the medial water line 74 passes through the RO cartridge 30, the post-treatment cartridge 28, and the first check valve 64 before either exiting the water filtration system 20 via the outlet water line 76 to the outlet 78 or through the blend water line 90 toward the tank. In the water filtration system 120 of FIG. 7, water that is directed to the medial water line 174 passes through the RO cartridge 130, through the first check valve 164, and is directed to either the blend water line 190 toward the tank, or is directed through the post-treatment cartridge 128 along the outlet water line 176 and to the outlet 178. In either system, waste water can also drain from the RO cartridge 30/130 through the second flow restrictor 88/188 to the drain 86/186.

Figure 8:
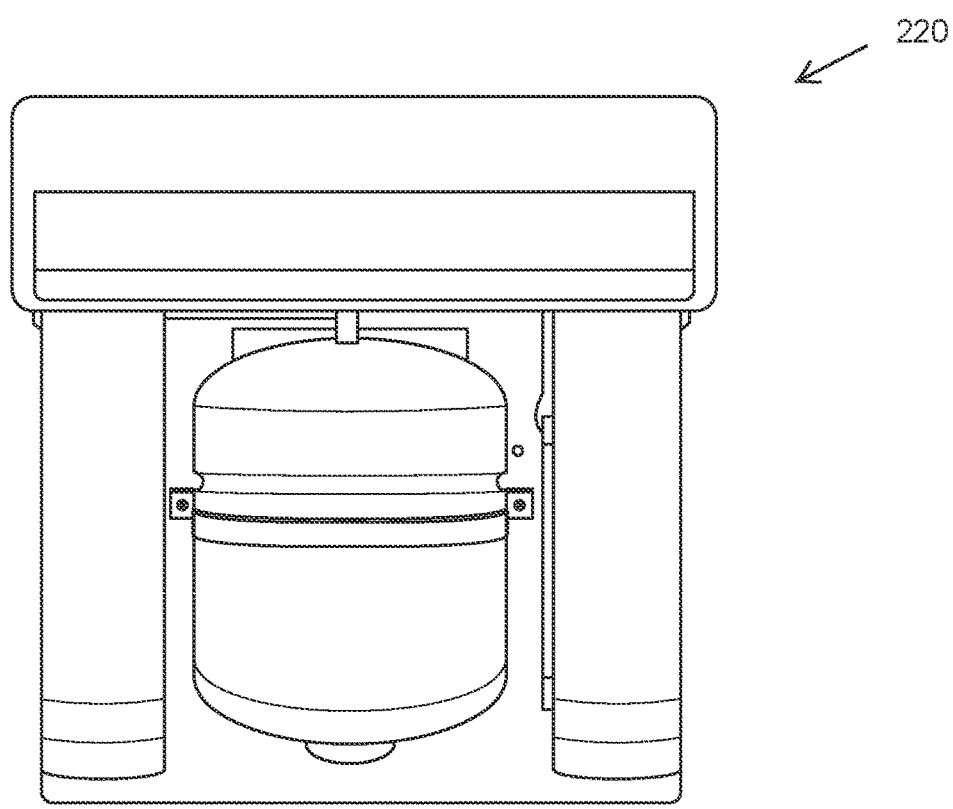
FIG. 8 is a side view of a housing for use with the water filtration system according to some embodiments of the invention.
Figure 9:
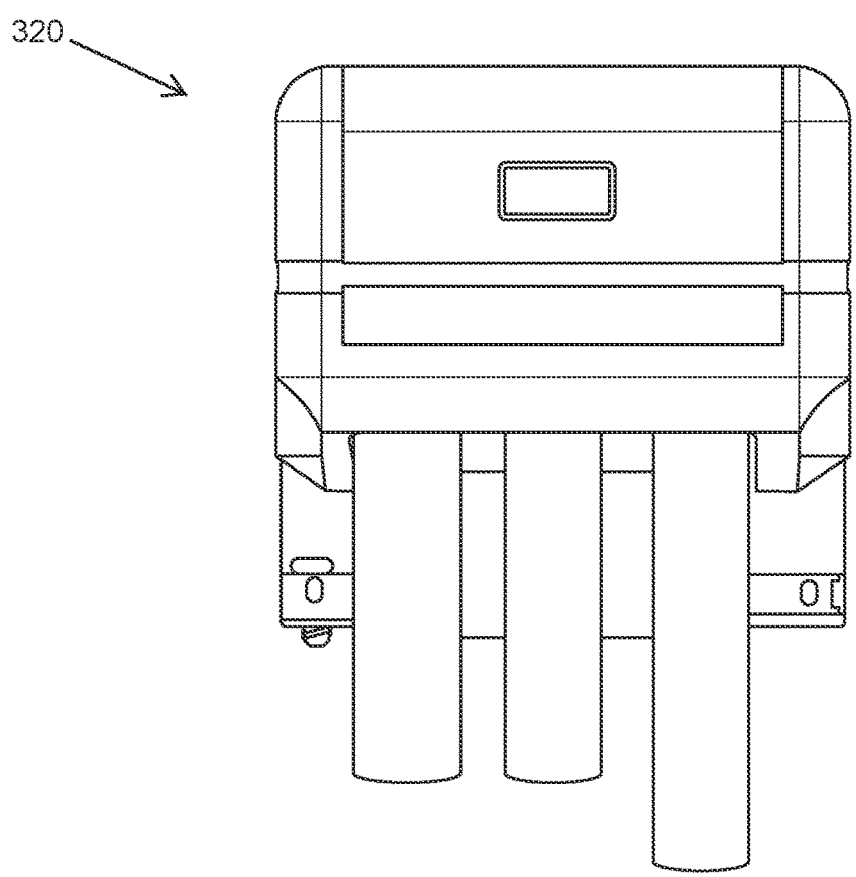
FIG. 9 is another side view of a housing for use with the water filtration system according to some embodiments of the invention.
Figure 10:
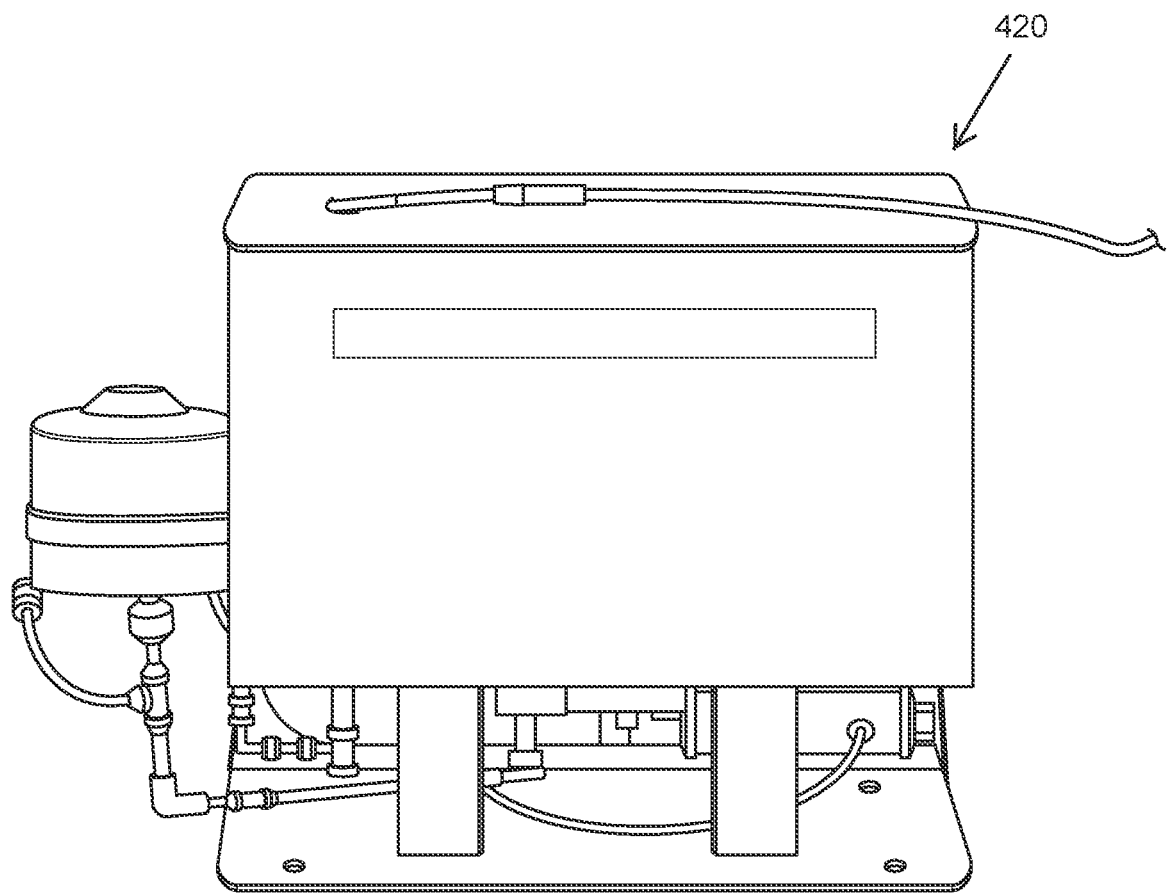
FIG. 10 is a perspective view of a housing for use with the water filtration system according to some embodiments of the invention.

FIGS. 8-10 illustrate external components of embodiments of housings of the water filtration system 20/120. The housings 220, 320 and 420 surround the components of the water filtration system 20/120. The water filtration system 20/120 may be installed by mounting on a wall. In some embodiments, the water filtration system 20/120 may be placed on a countertop. In other embodiments, the water filtration system 20/120 may be installed by placing the system under a counter. The water filtration system 20/120 may be used in numerous settings and may be secured to a variety of surfaces.

Embodiments of the invention include the use of a small orifice, i.e., a flow restrictor, in the unfiltered water line allowing the flowrates of the filtered water and the RO water to be balanced. Once the flowrates are balanced, the water that flows through the RO cartridge 30 and through the unfiltered water line 80/180 is mixed to achieve a desired level of mineral content. The addition of the first flow restrictor 82/182 helps to ensure that the water more consistently blends to and remains at a desired level. Also, producing the blended water mixture within the housing 40/220/320/420 of the water filtration system 20/120 has been found to substantially improve the quality of the blended water. The blended water can then directed to a water storage tank in which the water can mix further. The water storage tank may be pressurized. The water filtration system 20/120 also permits tailored blending of water to produce the ideal mineral content. The water filtration system 20/120 may also allow for up to 50% water savings over conventional reverse osmosis systems.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A reverse osmosis water system for use with a water source, the system comprising:
a housing having an inlet and an outlet, the inlet receiving untreated water from the water source;
a reverse osmosis cartridge fluidly coupled to a medial waterline, the medial waterline transporting a first portion of pretreated water to the reverse osmosis cartridge;
an unfiltered waterline having a flow restrictor, the unfiltered waterline fluidly coupled to the medial waterline, the unfiltered waterline receiving a second portion of pretreated water; and
a blend waterline fluidly coupled to the medial waterline and the unfiltered waterline, the blend waterline transporting a blended water mixture to the outlet,
the blended waterline receiving filtered water delivered at a first flowrate from the medial waterline downstream of the reverse osmosis cartridge and unfiltered water delivered at a second flowrate from the unfiltered waterline downstream of the flow restrictor, the flow restrictor providing the second flowrate at a substantially equal rate to the first flowrate.

2. The reverse osmosis water system of claim 1, wherein the unfiltered waterline includes a blend valve that modifies the flowrate in the unfiltered waterline.

3. The reverse osmosis water system of claim 1, wherein a pre-filter cartridge, the reverse osmosis cartridge, and a post-treatment cartridge are in series with respect to one another.

4. The reverse osmosis water system of claim 1, further comprising a post-treatment cartridge downstream of the reverse osmosis cartridge.

5. The reverse osmosis water system of claim 4, wherein the post-treatment cartridge is downstream of a blend valve.

6. The reverse osmosis water system of claim 4, wherein the filtered water passes through the post-treatment cartridge before mixing with the unfiltered water from the unfiltered waterline.

7. The reverse osmosis water system of claim 4, wherein the post-treatment cartridge adds minerals to the filtered water.

8. The reverse osmosis water system of claim 4, further comprising a check valve downstream of the reverse osmosis cartridge and upstream of the post-treatment cartridge.

9. The reverse osmosis water system of claim 1, and further comprising a pump downstream of a pre-filter cartridge and upstream of the reverse osmosis cartridge.

10. The reverse osmosis water system of claim 9, wherein the medial waterline fluidly couples the pump with the reverse osmosis cartridge and a post-treatment cartridge.

11. The reverse osmosis water system of claim 1, wherein a retentate stream exits the reverse osmosis cartridge via a drain waterline.

12. The reverse osmosis water system of claim 11, wherein the drain waterline includes a second flow restrictor configured to control a third flowrate of the retentate stream.

13. The reverse osmosis water system of claim 1, wherein the medial waterline and the unfiltered waterline are parallel with respect to one another.

14. A reverse osmosis water system for use with a water source, the system comprising:
   an inlet and an outlet, the inlet receiving untreated water from the water source;
   a reverse osmosis cartridge fluidly coupled to a medial waterline, the medial waterline providing a first portion of pretreated water to the reverse osmosis cartridge; and
   an unfiltered waterline fluidly coupled to the medial waterline and receiving a second portion of pretreated water at a first flowrate, the unfiltered waterline having a flow restrictor and a blend valve, the flow restrictor reducing the first flowrate to a second flowrate; and
   a blend waterline fluidly coupled to the medial waterline downstream of the reverse osmosis cartridge and fluidly coupled to the unfiltered waterline downstream of the flow restrictor and the blend valve, the unfiltered waterline providing unfiltered water to the blend waterline at the second flowrate, the reverse osmosis cartridge providing filtered water to the blend waterline at a third flowrate, the flow restrictor and the blend valve controlling the second flowrate to be substantially equal to the third flowrate.

15. The reverse osmosis water system of claim 14, further including a blend valve knob operable to manipulate one or more settings of the blend valve.

16. The reverse osmosis water system of claim 14, wherein the unfiltered waterline includes a check valve downstream from the flow restrictor and upstream from the blend valve.

17. The reverse osmosis water system of claim 14, further comprising a pump downstream of a pre-filter cartridge and upstream of the reverse osmosis cartridge.

18. The reverse osmosis water system of claim 17, further comprising a solenoid valve downstream of the pre-filter cartridge and upstream of the pump.

19. The reverse osmosis water system of claim 17, wherein the pump is fluidly coupled to the flow restrictor and the blend valve by the unfiltered waterline.

20. A reverse osmosis water system for use with a water source, the system comprising:
   an inlet and an outlet, the inlet receiving untreated water;
   a pre-filter cartridge fluidly coupled to the inlet via an inlet waterline;
   a reverse osmosis cartridge fluidly coupled to the pre-filter cartridge, the reverse osmosis cartridge receiving a first portion of pretreated water from the pre-filter cartridge; and
   an unfiltered waterline in parallel to the reverse osmosis cartridge, the unfiltered waterline receiving a second portion of pretreated water from the pre-filter cartridge, the unfiltered waterline having a flow restrictor; and
   a blend waterline receiving unfiltered water from the flow restrictor and filtered water from the reverse osmosis cartridge, the reverse osmosis cartridge providing the filtered water a first flowrate and the flow restrictor providing the unfiltered water at a second flowrate, the first flowrate and the second flowrate being substantially equal.

* * * * *